US006967339B2

(12) United States Patent
Leblans et al.

(10) Patent No.: US 6,967,339 B2
(45) Date of Patent: Nov. 22, 2005

(54) NEEDLE-SHAPED CYLINDRICAL STORAGE PHOSPHOR CRYSTALS

(75) Inventors: Paul Leblans, Kontich (BE); Luc Struye, Mortsel (BE)

(73) Assignee: Agfa-Gevaert, Mortsel (BE)

( * ) Notice: Subject to any disclaimer, the term of this patent is extended or adjusted under 35 U.S.C. 154(b) by 226 days.

(21) Appl. No.: 10/390,481

(22) Filed: Mar. 17, 2003

(65) Prior Publication Data

US 2003/0189179 A1    Oct. 9, 2003

Related U.S. Application Data

(60) Provisional application No. 60/370,737, filed on Apr. 8, 2002.

(30) Foreign Application Priority Data

Mar. 26, 2002  (EP) ................................. 02100295

(51) Int. Cl.[7] ............................................. C09K 11/08
(52) U.S. Cl. .................................... 250/484.1; 250/580
(58) Field of Search ........................... 250/484.4, 580, 250/581, 582, 367, 483.1, 588, 589; 378/98.8; 428/690; 313/467

(56) References Cited

U.S. PATENT DOCUMENTS

| 5,171,996 | A | | 12/1992 | Perez-Mendez | ......... 250/361 R |
|---|---|---|---|---|---|
| 5,187,369 | A | * | 2/1993 | Kingsley et al. | ........ 250/370.11 |
| 5,449,449 | A | | 9/1995 | Vieux et al. | ................. 205/201 |
| 6,512,240 | B1 | * | 1/2003 | Leblans et al. | ............. 250/588 |
| 6,528,812 | B1 | * | 3/2003 | Leblans et al. | ............. 250/588 |
| 6,815,092 | B2 | * | 11/2004 | Van den Bergh et al. | ... 428/690 |
| 2001/0007352 | A1 | * | 7/2001 | Hell et al. | ............... 250/484.4 |
| 2004/0001953 | A1 | * | 1/2004 | Struye et al. | ............... 428/408 |
| 2004/0042585 | A1 | * | 3/2004 | Nagarkar et al. | .......... 378/98.8 |
| 2004/0051438 | A1 | * | 3/2004 | Leblans et al. | ............. 313/467 |

FOREIGN PATENT DOCUMENTS

| EP | 0 174 875 | | 3/1986 | |
| EP | 1 113 458 | | 7/2001 | |
| EP | 1113458 A1 | * | 7/2001 | ............ G21K 4/00 |
| EP | 1359204 A1 | * | 11/2003 | ........... C09K 11/08 |

OTHER PUBLICATIONS

European Search Report, Application No. 02 10 0295, Jul. 15, 2002.

* cited by examiner

Primary Examiner—Otilia Gabor
(74) Attorney, Agent, or Firm—Joseph T. Guy; Nexsen Pruet, LLC

(57) ABSTRACT

Needle-shaped CsBr:Eu$^{2+}$ storage phosphor crystal particles in form of a cylinder suitable for use in flat storage phosphor panels have been provided, wherein said particles have an average cross-section in the range from 1 μm up to 30 μm and an average length, measured along the casing of said cylinder, in the range from 100 μm up to 1000 μM.

44 Claims, 1 Drawing Sheet

NEEDLE-SHAPED CYLINDRICAL STORAGE PHOSPHOR CRYSTALS

The application claims the benefit of U.S. provisional application No. 60/370,737 filed Apr. 8, 2002.

FIELD OF THE INVENTION

The present invention relates to a storage phosphor having dimensions providing excellent image definition after having been stimulated by stimulation radiation. More specifically the invention relates to the package density of the needle-shaped storage phosphors in form of a cylinder after having been coated, the role of dyes, if present in or adjacent to a piled or stacked layer of said needle-shaped storage phosphors and the need to avoid presence of impurities like alkaline earth metals an rare earth metals as well as oily compounds or dust.

BACKGROUND OF THE INVENTION

Opposite to conventional radiography wherein an intensifying luminescent phosphor screen directly emits luminescent rays and wherein said screen is not a storage medium, radiation image recording and reproducing techniques utilizing a radiation image storage panel, referred to as the stimulable phosphor screen, sheet or panel, are provided with a stimulable phosphor. With radiation image recording and reproducing techniques, the stimulable phosphor of the radiation image storage panel is caused to absorb radiation, which carries image information of an object or which has been radiated out from a sample. Said stimulable phosphor is exposed to stimulating rays, such as visible light or infrared rays, which causes the stimulable phosphor to emit light in proportion to the amount of energy stored thereon during its irradiation exposure.

The emitted fluorescent light is then photoelectrically detected in order to obtain an electric signal. The electric signal is further processed, and the processed electric signal is utilized for reproducing a visible image on a recording material. This way of working, making use of storage phosphor sheets or panels as an intermediate storage medium is also called "computed radiography". This way of working is clearly differing from radiation detection by scintillator materials, directly emitting radiation upon X-ray irradiation as has e.g. been described in U.S. Pat. No. 5,171,996 for luminescent materials such as CsI, KI, RbI, CdS, $Zn_xCd_{1-x}S$, $CdWO_3$, $Ga_ySe$, $Gd_2O_2S$, $La_2O_2S$ or $PbO_2$.

As in radiography it is important to have excellent image quality for the radiologist to make an accurate evaluation of a patient's condition, important image quality aspects are image resolution and image signal-to-noise ratio.

For computed radiography signal-to-noise ratio depends on a number of factors.

First, the number of X-ray quanta absorbed by the storage phosphor screen is important. Signal-to-noise ratio will be proportional to the square-root of the number of absorbed quanta.

Second, the so-called fluorescence noise is important. This noise is caused by the fact that the number of photostimulated light (PSL) quanta detected for an absorbed X-ray quantum is small. Since a lot of the PSL light is lost in the detection process in computer radiography, fluorescence noise has an important contribution to the signal-to-noise ratio. It is important that, on the average, at least 1 photon is detected for every absorbed X-ray quantum. If this is not the case, many absorbed X-ray quanta will not contribute to the image and signal-to-noise ratio will be very poor.

This situation is most critical in mammography, where X-ray quanta are used with low energy. Softer X-ray will give rise to less PSL centres and, therefore, to less PSL photons than harder X-rays.

In computer radiography, a number of PSL centres are created by the absorbed X-ray quanta. Not all PSL centres are stimulated in the read-out process, because of the limited time available for pixel stimulation and because of the limited laser power available. In practice, only about 30% of the PSL centres is stimulated to give rise to a PSL photon. Since these photons are emitted and scattered in all directions, only 50% of the PSL photons are emitted at the top side of the storage phosphor screen, where they can be detected by the detection system. The emitted PSL photons are guided towards the detector by a light guide. This light guide may consist of an array of optical fibres, that forms rectangular detection area above the storage phosphor screen and has a circular cross-section at the detector side. This type of light guide has a numerical aperture of only 30%, which means that only 1 out of 3 of the emitted PSL photons is guided to the detector. In between the light guide and the detector a filter is placed, which stops the stimulation light reflected by the storage phosphor screen and transmits the PSL light emitted by the screen. This filter also has a small absorption and reflection of PSL light and transmits only ca. 75% of the PSL photons. In computer radiography a photomultiplier is commonly used to transform the PSL signal into an electrical signal. At 440 nm the photomultiplier has a quantum efficiency of ca. 20%. This means that only 1 out of 5 PSL quanta that reach the photomultiplier are detected.

In summary, for 1,000 PSL centres that are created in the storage phosphor screen only:

$$1{,}000 \times 0.3 \times 0.5 \times 0.3 \times 0.75 \times 0.2 = 6.75$$

PSL photons are detected. If it is required that every X-ray quantum gives rise to at least 1 detected PSL photon, therefore, the number of PSL centres created by an X-ray quantum should be sufficiently large. Or, conversely, the X-ray energy required to create a PSL-centre should be sufficiently small.

In mammography, a usual setting of the X-ray source is at 28 kVp. This leads to an X-ray spectrum, where the average energy of an X-ray quantum is of the order of 15 keV. For an X-ray quantum with this energy, in order to give rise to at least 1 detected PSL photon, the energy needed to create a PSL centre should be less than:

$$15{,}000 \times 6.75 / 1{,}000 = 100 \text{ eV}.$$

Furtheron is well-known that fine detail visualisation, high-resolution high-contrast images are required for many X-ray medical imaging systems and particularly in mammography. The resolution of X-ray film/screen and digital mammography systems is currently limited to 20 line pairs/mm and 10 line pairs/mm, respectively. One of the key reasons for this limitation is associated with the phosphor particle size in the currently used X-ray screens. In particular, light scattering by the phosphor particles and their grain boundaries results in loss of spatial resolution and contrast in the image. In order to increase the resolution and contrast, scattering of the visible light must be decreased. Scattering can be decreased by reducing the phosphor particle size while maintaining the phosphor luminescence efficiency. Furthermore, the X-ray to light conversion efficiency, the quantum detection efficiency (e.g. the fraction of absorbed X-rays convertable to light emitted after stimulation) and the screen efficiency (e.g. the fraction of emitted light escaping from the screen after irradiation with stimulating rays) shouldn't be affected in a negative way by the reduction of the phosphor particle size. As a particular advantage the computed radiographic recording and reproducing techniques presented hereinbefore show a radiation image containing a large amount of information, obtainable with a markedly lower dose of radiation than in conventional radiography. Radiation image recording and reproducing techniques are thus efficient, particularly for direct radiography, such as the X-ray image recording for medical diagnosis.

For clinical diagnosis and routine screening of asymptomatic female population, screen-film mammography today still represents the state-of-the-art for early detection of breast cancer. However, screen-film mammography has limitations which reduce its effectiveness. Because of the extremely low differentiation in radiation absorption densities in the breast tissue, image contrast is inherently low. Film noise and scatter radiation further reduce contrast making detection of microcalcifications difficult in the displayed image. So e.g. film gradient must be balanced against the need for wider latitude.

Computed Radiography (CR) systems can be broadly categorized as primary digital and secondary digital systems. Primary digital systems imply direct conversion of the incident radiation on a sensor into usable electrical signals to form a digital image. Secondary digital systems, on the other hand, involve an intermediary step in the conversion of radiation to a digital image. For example, in digital fluoroscopy, image intensifiers are used for intermediary conversion of X-rays into a visible image which is then converted to a digital image using a video camera. The scintillator materials described in U.S. Pat. No. 5,171,996 e.g. do not require a scanning procedure to become read out as there is no storage of energy as in stimulable or storage phosphor materials. X-ray quanta are directly converted into emitted light, which further generates electrical charges in a photoconductive layer, thereby providing generation of a visible image. Scattering of directly emitted light is decisive for sharpness, opposite to sharpness of storage phosphors used in digital X-ray systems wherein scattering of stimulating light, as a source of photostimulation of stored energy is of crucial importance. Digital X-ray images generated in systems making use of photostimulated luminescence (PSL) plates, first store the virtual image as energy. In a second step, the stored energy is converted into electrical signals using a laser to scan the PSL plate to form a digital image.

Furthermore, various schemes using silicon photodiode arrays in scanning mode for CR systems have been employed. However, these photodiode arrays require intermediate phosphor screens to convert X-rays into visible light, because of the steep fall-off in quantum efficiency (sensitivity) of the arrays at energies above 10 keV.

The above described secondary digital systems have several disadvantages, including loss in image resolution. Recent technological advances have however made it possible to overcome these difficulties by allowing semiconductor X-ray detectors to be used to generate usable X-ray images. High quality semiconductor X-ray detectors have been known for many years, but these detectors require a very sensitive preamplifier to produce a signal suitable for use. With recent advances in high density analog complementary metal oxide semiconductor (CMOS) integrated circuit technology and high density interconnection between semiconductor chips, the integration of thousands of these detector elements with preamplifiers on a single hybrid integrated circuit called a sensor chip is now possible. A semiconductor detector having an absorbing layer located between X-rays from an object and X-ray semiconductor is sensors has e.g. further been disclosed in U.S. Pat. No. 4,905,265.

Although significant improvements of clinical image quality in order to eliminate the need for repeated exposures due to poor film image quality caused by factors as radiation scatter noise, fog, blurring, mottle and artifacts have meanwhile been realized in that digital radiographic techniques enable medicins to perform quantitative radiography through image digitization and allows them, by useful enhancement techniques, such as edge enhancement of microcalcifications and transmission of mammograms to remote sites over computer networks; advantageously reducing the absorbed radiation dose received by a patient by at least a factor of seven as compared to screen-film mammography, further facilitating mammography for routine screening of asymptomatic population in the 35 years and older age group by significantly enhancing the benefit to risk equation, furthermore significantly reducing the absorbed dose to the patients during a needle localization biopsy procedure which can require as many as 10 exposures. As has been set forth in U.S. Pat. No. 5,596,200 another advantage of that invention was that it provides improved storage and retrieval of image data through the use of standard magnetic or optical disk media instead of the photographic film, further providing a device which is capital cost competitive with current X-ray imaging systems and which reduces the cost in materials and processing time by eliminating photographic film and associated chemicals, dark rooms and other peripherals, as well as reducing technician's time for film processing. In determining the desired semiconductor materials therein one has to take into account aspects as ease of fabrication, X-ray absorption, and operating temperature. For mammographic applications, two alternative detector materials, silicon and gallium arsenide, are preferred. Silicon detectors are much easier to fabricate than GaAs detectors, however, the silicon X-ray photon quantum absorption coefficient is much lower than GaAs. For applications in a primary X-ray digital imaging system having X-ray energies greater than approximately 25 keV, sensor materials with much higher X-ray absorption properties are needed. Consequently, GaAs, cadmium telluride, CdZnTe, indium antimonide, and germanium are detector materials should be used at energies greater than 25 keV. The number of rows and columns of detectors and their length and separation can further be changed depending on the specific design requirements of the X-ray imaging system. For example the length of the row and the number of rows can be any desired value up to the limit of the mechanical scan. It is also contemplated to have the sensor chips placed in an array-like fashion.

Since the image generated is isomorphic to the matrix of digital numbers generated during the scan, it can be processed by a signal processing unit 60 with suitable software. For example, the signal-to-noise ratio of the signals can be improved through processing. Data from signal processing are advantageously stored and archived on standard magnetic or optical disk media instead of photographic film. Data from a storage station are then sent to an image processing unit in which a variety of processing operations can be performed on the image. For example, the image processing unit can perform the image manipulations of: (1) magnification; (2) contrast enhancement and windowing; (3) enhancing sharpness and edge gradients; (4) attaching gray or color scales to enhance image quality; and (5) image subtraction. Images generated by image processing can be displayed on a video display, a printer, on film, or sent via image transmission network, which can include satellites or computer networks to send image data from remote radiology laboratories to a centrally located radiologist for virtually real time image interpretation and diagnosis. Applications in other areas of clinical imaging are possible as e.g. for low dose, low cost applications in breast computed tomography (CT); use in intelligent software for computer aided diagnosis (CAD); the stereotactic computerized placement of biopsy needle; and radiation control, monitoring and non-invasive imaging systems for applications in nuclear medicine. An apparatus for imaging a patient's breast by scanning an imaging signal and a receiver across the patient's breast and then constructing a time-delay integration composite image based on the scan has been described in U.S. Pat. No. 5,526,394. Said receiver includes an array of radiation sensitive detector elements, wherein read out of the array is synchronized with the scanning motion of the receiver based on output from position encoder such that synchronisation is maintained despite scan drive variances. An assembly for allowing selection of an appropriate radiation filter based on particular imaging conditions has also been disclosed therein.

U.S. Pat. No. 6,300,640 specifically relates to a composite phosphor screen for detecting radiation, particularly X-rays, utilizing nanocrystalline sized phosphors (nanophosphors) disposed in extremely small channels (microchannels) etched in a substrate.

Further improvements in X-ray imaging, as will always be desired, more particularly in mammographic applications, making use of a particular detector, have been set out hereinafter.

SUMMARY OF THE INVENTION

Therefore it is an object of the present invention to provide phosphor crystals having the desired dimensions in order to get optimized optical properties, and, more in detail, an optimized relationship between transparency to light and image definition, i.a. sharpness, when making use of the said phosphor crystals in a flat storage phosphor plate or panel.

It is a further object of the invention to provide a computer radiography system that allows imaging with good signal-to-noise ratio, even when using X-ray quanta having low energy as is the case in mammographic imaging.

The above mentioned objects have been realized by providing needle-shaped $CsBr:Eu^{2+}$ storage phosphor particles in form of a cylinder having an average cross-section diameter in the range from 1 $\mu$m to 30 $\mu$m (more preferred: from 2 $\mu$m up to 15 $\mu$m), an average length, measured along the casing of said cylinder, in the range from 100 $\mu$m up to 1000 $\mu$m (more preferred: from 100 $\mu$m up to 500 $\mu$m).

Specific features for preferred embodiments of the invention, more particularly with respect to the dimensions of the needle-shaped phosphor crystals, have been set out in the dependent claims.

Further advantages and embodiments of the present invention will become apparent from the following description and drawing. The above-mentioned advantageous effects are realized by having the specific features set out in claim 1. Specific features for preferred embodiments of the invention are set out in the dependent claims. Further advantages and embodiments of the present invention will become apparent from the following description [and drawing].

DETAILED DESCRIPTION OF THE INVENTION

Figure 1:
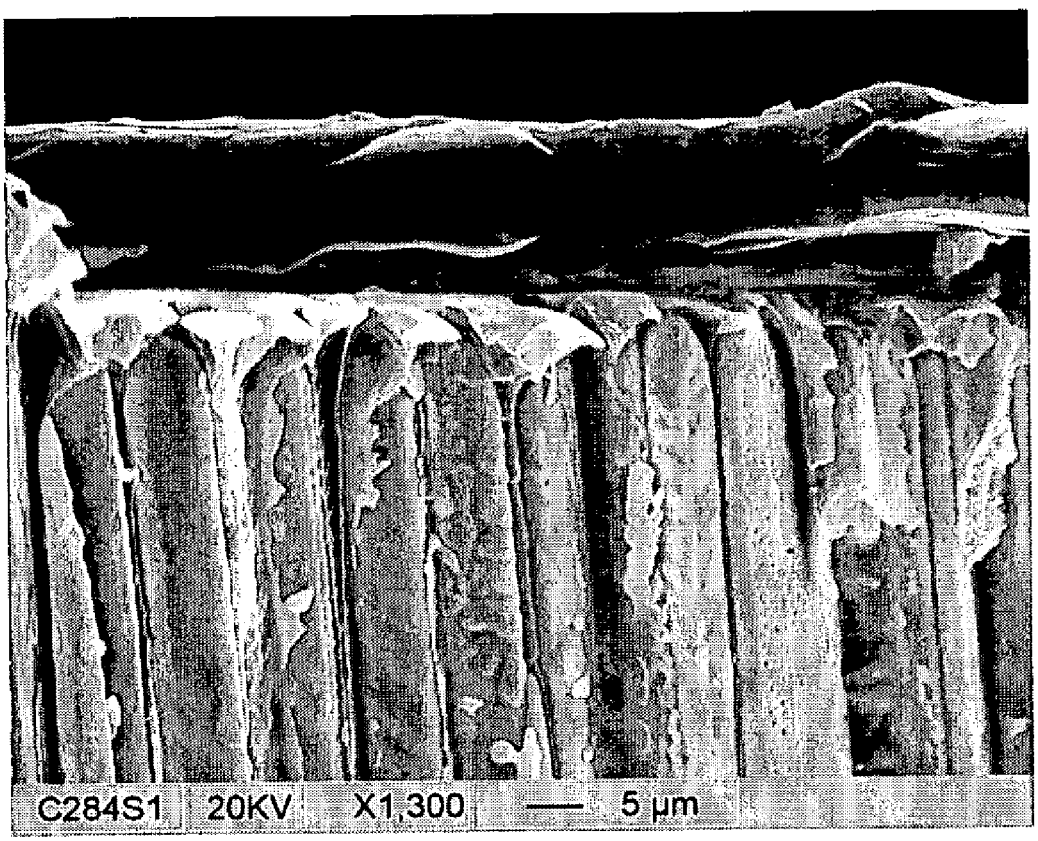
FIG. 1 shows a picture of a typical needle-shaped storage phosphor panel having phosphor particles in form of a cylinder, inclusive for its dimensions.

As a starting point with respect to image definition obtained from a needle-shaped phosphor like the preferred $CsBr:Eu^{2+}$ storage phosphor or stimulable phosphor in form of a cylinder, it was experimentally proved that needles having too small a cross-section did not allow stimulated radiation obtained upon photostimulation to pass through, whereas needles having too large diameters, although easily leaving radiation to pass through, were leading to unsharp images. Therefore needle-shaped $CsBr:Eu^{2+}$ storage phosphor particles in form of a cylinder were selected, said phosphor particles having an average cross-section diameter in the range from 1 $\mu$m to 30 $\mu$m, more preferably in the range from 2 $\mu$m up to 15 $\mu$m in order to provide sufficient sharpness, an average length, measured along the casing of said cylinder, in the range from 100 $\mu$m up to 1000 $\mu$m and more preferred in the range from from 100 $\mu$m up to 500 $\mu$m in order to provide enough speed.

One of the major challenges in reducing the particle size below 1 $\mu$m, lies in the precipitous decrease of the phosphor luminescence efficiency. This is attributed to the surface-related non-radiative processes that become dominant in the region between 1 $\mu$m to 0.01 $\mu$m: as a theoretical barrier the diameter should never be smaller than 440 nm, representing a realistic wavelength, so that the choice of 1 $\mu$m as a boundary value sufficiently departing from that wavelength is justified.

A sufficient number of needles should further be present as otherwise the needle structure is depicted as interference with the pixel size is not excluded. In mammography a pixel size of 60 $\mu$m is normally used, so that a diameter of 30 $\mu$m for one needle provides presence of ½ of a pixel: 4 needles are thus provided per pixel in that case, corresponding with a minimum as "aliasing" otherwise occurs. In a more preferred embodiment according to the present invention the needle-shaped phosphor should have an average diameter in the range from 2 $\mu$m up to 15 $\mu$m.

During manufacturing of the needles by the preferred chemical vapor deposition (CVD) technique it is observed that a slightly amorf layer deviating from a needle structure is formed in contact with the substrate: this layer, called "nuclei layer", has an average thickness in the range of about 30 $\mu$m, depending on the deposition parameters in the CDV process. In order to get a working system showing the most favorable compromise between sensitivity and signal-to-noise ratio it is recommended to provide needles having a length of the needles exceeding at least twice the thickness of the amorf nuclei layer. As a consequence 100 $\mu$m is the sub-boundary as smaller needle lengths lack sensitivity and high enough a signal-to-noise value.

Furtheron a needle length of more than 1000 $\mu$m is not desired as the intensity of laser light becomes weakened and cannot reach the bottom of the needle. Needle-layers exceeding 1000 $\mu$m cannot be read-out and are not contributing to the desired signals, the more as light emitted by stimulated radiation will not be able to escape from a needle-shaped layer having a thickness of more than 1000 $\mu$m. In a more preferred embodiment according to the present invention the needle-shaped phosphor should have an average length in the range from 100 µm up to 500 µm.

In addition a further preferred (dimensionless) parameter for the CsBr:Eu$^{2+}$ storage needle phosphor population is the average ratio of length to circular diameter in the needle population, which preferably is in the range from 5 to 200, and, more preferably, in the range from 20 to 100. In order to calculate this range the average length of the needles is calculated as well as the average thickness of as high a number of needle-shaped phosphor cylinders and from the ratio of both the corresponding figure is obtained.

The walls of the cylinders, acting as microchannels, are arranged in order to reflect the light emitted by the nanophosphors down the microchannel cylinders to a suitable light collecting device such as an electronic device. It is recommended to provide walls having a smooth surface inside the cylindrical coat as light will be conducted better without extreme aberrations or deviations.

Another important parameter characterizing the CsBr:Eu$^{2+}$ storage needle phosphor population is the variation coefficient upon average cross-section diameter and average casing length, as being indicative for the efficiency of light throughput and sharpness. So, in a preferred embodiment said variation coefficient is less than 0.30, in a more preferred embodiment less than 0.20 and most preferred even at most 0.10.

Needle-shaped CsBr:Eu$^{2+}$ storage phosphor particles according to the present invention are preferably coated in a storage phosphor plate or panel according to the present invention in amounts for said storage phosphor particles in the range of from 17 mg/cm$^2$ up to 400 mg/cm$^2$.

The needle-shaped CsBr:Eu$^{2+}$ storage phosphor having dimensions as set forth in the statement of the present invention has a high conversion efficiency, for which a low amount of X-ray energy is needed in order to create a PSL centre. A phosphor has been invented for which the amount of X-ray energy needed to create a PSL centre is less than 100 eV and, moreover, has desired dimensions as expressed in the claims. In addition, a manufacturing procedure leading to this phosphor having high quality is presented.

According to the present invention a storage phosphor screen or panel is provided, said screen or panel emitting radiation after stimulation of phosphor particles having stored energy from X-rays having impinged upon said screen or panel, said panel comprising:
  a substrate having a planar surface;
  a multiplicity of cylindrical needle-shaped phosphors extending onto the surface of the substrate, said phosphors being the needle-shaped CsBr:Eu$^{2+}$ storage phosphor particles in form of a cylinder, set forth hereinbefore.

In a preferred embodiment said multiplicity of needle-shaped phosphors forms a binderless phosphor layer.

As a basic structure the radiation image storage panel comprises a substrate and a stimulable phosphor layer overlaid on one surface of the substrate, unless in cases wherein the stimulable phosphor layer has self-supporting properties. Then the radiation image storage panel need not necessarily be provided with the substrate. In another embodiment the needle-shaped phosphors have been vapor deposited in the (whether or not structured) substrate layer, as e.g. when the substrate is composed of so-called "hollow fibres". Commonly the stimulable phosphor layer is constituted of a layer, which comprises a binder and a stimulable phosphor dispersed in the said binder. Needle-shaped columnar phosphors having dimensions as in the present invention after having been deposited by the preferred chemical vapor deposition technique however are piled up perpendicular to the subbed support in a regularly ordered way as an evaporated layer, wherein said regularly ordered layer is not predetermined by previously formed patterns as in U.S. Pat. No. 5,171,996.

The radiation image storage panel provided with needle-shaped phosphors having dimensions as in the present invention, may, apart from a substrate, adjacent to the support material, have a reflecting or anti-reflecting layer and/or a dye-containing antihalation layer. A layer having anti-reflecting properties may be composed of an inorganic material as e.g. MgF$_2$ without however being limited thereto.

The radiation image storage panel according to the present invention will be described further hereinafter by taking a radiation image storage panel with a typical constitution comprising the substrate, optionally a light reflecting layer and/or a dye-containing antihalation layer, and a stimulable phosphor layer.

The support may be constituted of a material selected from various kinds of support materials, commonly employed in known radiation image storage panels such as films of plastic substances, like cellulose acetate, polyester, polyethylene terephthalate, polyamide, polyimide, triacetate, polycarbonate, Kevlar®, metal sheets, such as an aluminum foil and an aluminum alloy foil; paper, such as ordinary paper, baryta paper, resin-coated paper, pigment paper containing a pigment, such as titanium dioxide, and paper sized with a polyvinyl alcohol, or the like.

Alternatively the support may be a glass support, whether or not colored or a synthetic resin material resisting heat, having been provided with a vacuum deposited metal layer. In this respect materials normally used in electronic circuits (PCB) are very suitable for use as a substrate. As an example thereof a synthetic material called PERTINAX® whereupon a layer of copper having a thickness in the range from 10 µm up to 200 µm has been vapor deposited, is very suitable for use. This synthetic material is resisting destruction by heat up to temperatures exceeding 250° C., thus providing vapor deposition without deterioration.

As X-ray absorption of such a synthetic resin material is very low, an X-ray detector (a so-called AEC detector) may be mounted behind the sythetic support in order to measure the X-ray dose. As a consequence aluminum is only suitable for use as metal layer when its thickness is low enough.

Copper as a vapor deposited material moreover provides a reflecting metal layer having very good adhesion properties to the synthetic support material not showing the disadvantageous properties of glass substrates like brittleness and flare.

In order to improve the adhesion of the support of the radiation image storage panel of the present invention with the phosphor layer, with an intermediate dye-containing antihalation layer, or with a reflecting or anti-reflecting layer formed, a layer imparting adhesive properties is recommended, wherein said layer is constituted of a high-molecular weight material, resisting high temperatures used in the vapor depositing step of the needle-shaped phosphors.

A light (anti)reflecting layer may be formed by preparing a coating composition containing a light (anti)reflecting substance, a binder, and a solvent, uniformly applying the coating composition onto the substrate surface in order to form a coating film of the coating composition. The binder and the solvent for the formation of the light (anti)reflecting layer may be selected from binders and solvents, which are employed for the formation of the stimulable phosphor layer. Ordinarily, the mixing ratio of the binder to e.g. a white pigment in the coating composition for the formation of the light reflecting layer may be selected from the range between 1:1 and 1:50, said indiviudal figures having been expressed as weight ratios. From the point of view of the (anti)reflection characteristics of a light (anti)reflecting layer, the proportion of the binder should preferably be as low as possible. When the easiness of the formation of the light (anti)reflecting layer and the mechanical and physical strength of the radiation image storage panel are taken into consideration, the mixing ratio of the binder to the exemplified pigment in the coating composition for the formation of the light (anti)reflecting layer should preferably be selected from the range between 1:2 and 1:20, again expressed as weight ratios. The thickness of the light reflecting layer should preferably fall within the range of 5 $\mu$m to 100 $\mu$m. The coating composition for the formation of the light reflecting layer may be applied with ordinary coating means, such as a doctor blade, a roll coater, or a knife coater. After the coating film of the coating composition is formed on the substrate surface, the coating film is heated little by little and dried.

Pigments or dyes may be deposited in the interstices between the stimulable phosphor needle crystals together with the stimulable phosphor, provided that dye vapor deposition is possible. Therefore it is required to have a dye or pigment that is not decomposed and the optical characteristics of which are left unchanged under the influence of increased temperatures during vapor deposition together with the storage phosphor. In such cases, the ratio (weight ratio) of the stimulable phosphor to the dye or pigment should preferably fall within the range between 1000,000:1 and 1,000:1. In cases where the pigment is introduced together with the storage phosphor into the stimulable phosphor layer, a light reflecting layer for reflecting the stimulating rays may be formed on one surface of the stimulable phosphor layer. Examples of dyes suitable for use within the scope of the present invention are Methylene Blue ($C_{16}H_{18}ClN_3$), Azure B ($C_{15}H_{17}ClN_3S$), Toluidine Blue 0 ($C_{15}H_{16}N_3SCl$), Thionin ($C_{12}H_{10}ClN_3S$), Indocyanine Green (IGC)($C_{43}H_{47}N_2O_6S_2Na$), Magnesium Phthalocyanine, Oxatricarbocyanine, Indotricarbocyanine, Zinc Phthalocyanine, Oxazine, Cryptocyanine and Tetra-1-butyl-naphthalocyanine, but as most preferred pigment dye β-copper phthalocyanine ($CuC_{32}N_6H_{16}$) has been selected, as being the chemically most stable dye in the series mentioned above. Coating of very thin, homogeneously colored layers is attained, without undesired gaps inbetween the needle-shaped phosphor crystals. As the preferred pigment dye is blue colored a very good absorption of red laser radiation and a very good transmission of blue light is possible. Said β-copper phthalocyanine is available from Ciba-Geigy, Switzerland.

According to the present invention a method is offered in order to incorporate a dye or pigment in a needle-shaped image phosphor plate. After having been dipped in an alcoholic solution wherein the pigments or dyes have been dissolved, the said phosphor plate is preferably dried in air in order to evaporate the alcohol present, and in order to immobilize the dye in the phosphor plate. In a preferred embodiment according to the present invention a binder is present in the alcoholic dye solution used in the said method, in low-amounts, preferably in an amount of from 1% up to 10% by weight. Presence of a dye avoids light transfer from one needle to another (adjacent) needle and enhances the advantageous effect of the needle structure: this result in an even further improved sharpness or image definition, although a slight speed decrease may be detected. According to the present invention the storage phosphor plate or panel preferably comprises one or more dyes in an amount of from 1 $\mu$g/m up to 1000 $\mu$g/m.

As already set forth hereinbefore it is recommended to provide walls having a smooth surface inside the cylindrical coating. In a preferred embodiment the walls of said cylinders are dyed or colored with a dye or pigment, absorbing stimulation radiation impinging thereon.

According to the present invention the storage phosphor screen has a light reflective coating disposed along the walls of said cylinders, arranged in order to reflect, at least partially (and, most preferably, integrally), radiation emitted by said phosphors after having performed stimulation thereupon.

In another embodiment a reflective coating is disposed along the walls of said cylinders, and more preferably the said reflective coating is a metallic coating. In case of a metallic coating a metal selected from the group consisting of gold, silver, platinum, palladium, nickel and aluminum is most preferred.

A transparent protective film constituted of a plastic material for physically and chemically protecting the stimulable phosphor layer is commonly formed on the surface of the stimulable phosphor layer, which surface is opposite to the substrate side surface. The radiation image storage panel in accordance with the present invention should thus preferably be provided with such a transparent protective film. The protective film may be formed on the stimulable phosphor layer with, for example, a technique, wherein a plastic film is prepared previously and is then adhered to the surface of the stimulable phosphor layer with an adhesive agent. Alternatively, the protective film may be formed on the stimulable phosphor layer with a technique, wherein a coating composition containing a protective film material is applied onto the surface of the stimulable phosphor layer and is then dried.

A fine particle filler may be contained in the protective layer in order to reduce interference nonuniformity and in order to enhance the image quality of the radiation image. Examples of resins appropriate for the production of the light-permeable plastic film include polyester resins, such as a polyethylene terephthalate and a polyethylene naphthalate; and cellulose ester derivatives, such as cellulose triacetate. For the production of the light-permeable plastic film, various resin materials, such as a polyolefin and a polyamide, may also be employed. The thickness of the protective film should preferably fall within the range of approximately a few $\mu$m (e.g. 3 $\mu$m up to about 20 $\mu$m, in favor of sharpness). Adjacent to the protective coating an anti-reflecting layer, e.g. a layer of $MgF_2$ may further be added.

Said storage phosphor screen moreover preferably comprises radiation attenuating means coated atop at least part of the needle-shaped cylindrical phosphor particles, disposed in order to selectively attenuate radiation. In a preferred embodiment said screen is provided with radiation attenuating means comprises a coating disposed atop certain of the microchannels.

A storage phosphor screen according to the present invention further includes means for collecting radiation emitted by the storage phosphors upon stimulation.

As is further well-known many attempts have been performed to produce a digital medical X-ray imager. The energy distribution of the X-rays in the image plane is determined by the irradiated subject matter, human tissue and bone, resulting in an almost continuous energy spectrum both spatially and on an intensity scale. The image is generally a low contrast image whose gray tones need to be preserved for accurate diagnosis. Such an X-ray image has conventionally been recorded successfully on film in an analogue way. Digital recording devices as in the present invention however determine the intensity averaged over picture elements or pixels. The physical detection process and the spacing of the pixels determines the resolution of the device. The intensity at each pixel is normally binned into one of a finite number of levels. Hence, the gray scale resolution is limited to this number of levels rather than being a continuous spectrum of values. All known devices attempt to optimize resolution and gray scale performance but are is usually limited in one aspect or another. Direct conversion devices thus include the use of a layer of selenium for attenuating the X-rays and generating free electron-hole pairs for collection by suitable electrodes. They also include other methods such as conversion of X-rays in solid or gas media followed by multiplication of emitted electrons, conversion and charge collection in pixelized CCD cameras. Indirect conversion devices thus make use of photostimulable phosphors set forth above for converting the X-rays into visible light, wherein said photostimulable phosphors store the image for later activation by red light. The phosphor can thus be "read-out" by a scanning laser, emitting blue light in conformity with the stored image. Furtheron the emitted light is collected and detected by a photomultiplier.

As, apart from coating a pigment dye together with the storage phosphor particles as disclosed hereinbefore, the said pigment dye may also be coated in very thin layers on a Fibre Optic Plate (FOP), preferably being constituted of clear glass and, as is generally known, the collection efficiency of such FOP's is much better than from other optical components. As a consequence an opportunity is offered to provide light emitted by needle-shaped phosphor after stimulation to be led in an ideal way to a CCD-device, via such a FOP, covered with the said pigment dye. The said dye pigments can be coated from an alcoholic dye solution as already described hereinbefore or can be vapor-deposited.

It has been established that absence of impurities in the needle-shaped phosphors and in the corresponding needle-shaped phosphor storage panel is highly desired.

First of all absence of impurities from dopants is desired. The selected $CsBr:Eu^{2+}$ phosphor should preferably be free from alkaline metal(ion)s, more particularly from those selected from the group consisting of lithium, sodium, potassium and rubidium; from alkaline earth metal(ion)s like strontium; as well as from thallium. Presence of concurrent samarium is further highly desired.

However, if present, due to the production process, an analysis of those elements should indicate presence of the aforementioned elements in amounts of less than 0.01 mole %, and more preferably less than 0.001 mole %. In p.p.m. amounts those impurities should be present in amounts of less than 100 p.p.m., more preferably less than 10 p.p.m.

According to the present invention the storage phosphor plate or panel having needle-shaped $CsBr:Eu^{2+}$ storage phosphor particles, if comprising any one of the alkaline earth metals Li, Na, K, Rb; the earth alkaline eart metal Sr or any one of the lanthanides Sm. Tm and Pr, amounts of not more than 100 p.p.m. thereof are preferred and, even more preferably, amounts of not more than 10 p.p.m..

Apart from impurities set forth above absence of oil and dust is highly desired. Presence of oil may be due to losses of oil from the vacuum deposition unit, thereby causing penetration of oil inbetween the needles of the needle-shaped phosphor. As the material shows an undesired glare at its surface and as it gets more transparent, these phenomena are clearly indicating changes in reflection and scattering properties. Although bringing about an increased sharpness as scattering is lowered, presence of oil in amounts that are not reproducible cannot be allowed as making part of an uncontrollable production step. Otherwise an opportunity is offered when adding small amounts of oil in a controlled production step (e.g. by spraying) and cleaning the surface from excessive amounts of oil (avoiding presence of oil at the surface, thus providing oil to have penetrated inbetween the needle-shaped phosphor particles). If however present on storage plates or panels according to the present invention, oil or dust should preferably be present in amounts not exceeding about 10 p.p.m.

As the temperature of the substrate has an influence on the diameter of the needles during formation, it is clear that it also has an influence on the packing density. A preferred temperature of the substrate while depositing the needle-shaped phosphor particles is in the range of about 250° C.

Preferably the binderless phosphor screen is prepared by vacuum deposition under an inert gas atmosphere, like e.g. argon. It was found that by adjusting the temperature of the substrate and the pressure of the inert gas during vacuum deposition, the crystal dimensions of the needles and the packing density could be adjusted to the desired level.

As an inert gas suitable for use during vapor deposition Ar is preferred. The temperature of the gas stream that enters the vacuum deposition apparatus is advantageously kept in the temperature range between 0° C. and 1000° C. Preferably the gas stream is kept at room temperature, i.e., between about 200° C. and about 300° C. The cool gas stream entering the vacuum deposition apparatus can cool both the vapor before it is deposited as well as the substrate. It is preferred to keep said substrate at a temperature, T, so that $50°\ C.\leq T\leq 300°\ C.$, and more preferably so that $90°\ C.\leq T\leq 200°\ C.$ The Ar-pressure most preferably is at most 10 Pa, more preferably kept between 1 Pa and 3 Pa, both limits included.

It was found that when a phosphor screen was prepared under the circumstances set out above macroscopic dimensions of the needles could be influenced: when a method as described above was used, thin needles were obtained with a diameter between 2 $\mu$m and 10 $\mu$m. This was especially so when the rate of vapor deposition of the phosphor or phosphor precursors was above 1 $mg/cm^2min$. The packing density of the needles is between 70% and 90%.

In a display screen coating, the phosphors should exhibit a high packing density, so that an optimum brightness of the display screen can be attained. In addition the phosphor in the display screen coating should be homogeneously distributed, i.e. the photosensitive phosphor suspensions should not form "reams" and "pinholes" in the drying process. The individual pixels in the display screen coating should exhibit a high definition and accurately reproduce the shadow mask structure. The colors of the phosphors should retain their color purity in the coating process. In addition, the display screen coating should adhere well, and the non-exposed regions of the display screen should be haze-free.

In the present application which is directed to further improvements in the construction of flat storage phosphor screens or panels, manufacture and operation of those phosphor screens is optimized by application of coatings or layer arrangements used to increase the light output of the screens, and more particularly, by improving the dimensions of the deposited storage phosphor crystals having a cylindrical shape. Selective filtering and/or attenuation of X-ray energy applied to the screens which permits X-ray energy to be detected in a single exposure may further be provided by coatings arranged in order to reflect light where desired, further being transparent to X-rays. Within this scope as set forth improvements with respect to storage phosphor screens have been described in earlier applications as in EP-A's 1 065 525, 1 103 846 and 1 113 458; in WO 01/003156 and in U.S. application Ser. No. 0159004; and EP-A's 1 286 362, 1 286 363, 1 286 364, 1 286 365; as well as in EP-Applications Nos. 01 000 694, 01 000 695, 01 000 696, 01 000 697, filed Dec. 3, 2001 and in EP-Application No. 01 000 711, filed Dec. 5, 2001.

According to the present invention use is further made of a radiation image storage phosphor panel as set forth hereinbefore, wherein in an image forming method for storing and reproducing a radiation image the method comprises the steps of exposing said radiation image storage panel with radiation energy having passed through an object or having been emitted by said object and storing said radiation energy in form of a latent image on said image storage panel; releasing the stored energy in form of light upon irradiation with a stimulating rays of the visible or infrared region, thereby emitting light from the ultraviolet or visible wavelength region; collecting said light released from the storage panel by light-collecting means; converting the collected light into a series of electric signals; and producing an image corresponding to the latent image from the electric signals.

While the present invention will hereinafter be described in examples connection with preferred embodiments thereof, it will be understood that it is not intended to limit the invention to those embodiments.

EXAMPLES

In order to incorporate a dye or pigment in the needle-shaped image phosphor plate, the pigments or dyes were dissolved in an alcoholic solution. The said phosphor plate was dipped into the alcoholic solution and dried in air: as alcohol was evaporated, the dye was immobilized in the phosphor plate. In said alcoholic dye solution MOWILITH CT5 (a copolymer of vinylacetate and crotonic acid, trade name of Hoechst AG, Frankfurt, Germany) was present as a binder in an amount of 5% by weight.

In another experiment a needle-shaped phosphor layer of a CsBr:Eu$^{2+}$ storage phosphor was vacuum deposited onto glass. Sensitivity (speed) and homogeneity were determined.

A drop of oil was spread over the surface of the phosphor layer with soft tissue in order to provide penetration of the oil inbetween the vaccuum-deposited needles. An increase in surface glare and transparency was visually observed.

Sensitivity (speed) and homogeneity were determined again: whereas speed was decreased with a factor in the range between 2 and 3, homogeneity was negatively influenced as in the image obtained, strongly differing "cloudy" sites were observed. This was indicative for local differences in texture as influence of oil contamination was differing from site to site (sites having largest diameters in the range from 2 mm up to 5 mm. Speed could not be restored afterwards in order to reach its highest original level, even not after performing a new annealing step.

Sensitivity (speed) and homogeneity were determined again after 14 days: identical results were obtained, according to those measured immediately after addition of the oil drop.

From these measurements it could be established that the influence of oil was permanent.

Having described in detail preferred embodiments of the current invention, it will now be apparent to those skilled in the art that numerous modifications can be made therein without departing from the scope of the invention as defined in the appending claims.

What is claimed is:

1. Needle-shaped CsBr:Eu$^{2+}$ storage phosphor particles in form of a cylinder having an average cross-section diameter in the range from 1 to 30 μm and an average length, measured along the casing of said cylinder, in the range from 100 μm up to 1000 μm.

2. Needle-shaped CsBr:Eu$^{2+}$ storage phosphor particles according to claim 1, wherein said average cross-section diameter is in the range from 2 to 15 μm and wherein said average length is in the range from 100 μm up to 500 μm.

3. Needle-shaped CsBr:Eu$^{2+}$ storage phosphor particles according to claim 2, wherein said phosphor particles have an average aspect ratio of length to cross-section diameter in the range from 5 to 200.

4. A radiation image storage phosphor screen or panel emitting radiation after stimulation of phosphor particles having stored energy from X-rays having impinged upon said screen or panel, said panel comprising a substrate having a planar surface; a multiplicity of cylindrical needle-shaped phosphors extending onto the surface of the substrate, said phosphors being the needle-shaped CsBr:Eu$^{2+}$ storage phosphor particles in form of a cylinder, according to claim 3.

5. Radiation image storage phosphor screen according to claim 4, wherein a light reflective coating is disposed along the walls of said cylinders, arranged in order to reflect, at least partially, radiation emitted by said phosphors after having performed stimulation thereupon.

6. Use of a radiation image storage phosphor panel according to claim 4 in an image forming method for storing and reproducing a radiation image comprising the steps of exposing said radiation image storage panel with radiation energy having passed through an object or having been emitted by said object and storing said radiation energy in form of a latent image on said image storage panel; releasing the stored energy in form of light upon irradiation with stimulating rays of the visible or infrared region, thereby emitting light from the ultraviolet or visible wavelength region; collecting said light released from the storage panel by light-collecting means and converting the collected light into a series of electric signals; producing an image corresponding to the latent image from the electric signals.

7. Needle-shaped CsBr:Eu$^{2+}$ storage phosphor particles according to claim 2, wherein said phosphor particles have an average aspect ratio of length to crosssection diameter in the range from 20 to 100.

8. A radiation image storage phosphor screen or panel emitting radiation after stimulation of phosphor particles having stored energy from X-rays having impinged upon said screen or panel, said panel comprising a substrate having a planar surface; a multiplicity of cylindrical needle-shaped phosphors extending onto the surface of the substrate, said phosphors being the needle-shaped CsBr:Eu$^{2+}$ storage phosphor particles in form of a cylinder, according to claim 7.

9. Radiation image storage phosphor screen according to claim 8, wherein a light reflective coating is disposed along the walls of said cylinders, arranged in order to reflect, at least partially, radiation emitted by said phosphors after having performed stimulation thereupon.

10. Use of a radiation image storage phosphor panel according to claim 8 in an image forming method for storing and reproducing a radiation image comprising the steps of exposing said radiation image storage panel with radiation energy having passed through an object or having been emitted by said object and storing said radiation energy in form of a latent image on said image storage panel; releasing the stored energy in form of light upon irradiation with stimulating rays of the visible or infrared region, thereby emitting light from the ultraviolet or visible wavelength region; collecting said light released from the storage panel by light-collecting means and converting the collected light into a series of electric signals; producing an image corresponding to the latent image from the electric signals.

11. Needle-shaped $CsBr:Eu^{2+}$ storage phosphor particles according to claim 2, wherein variation coefficients upon average cross-section diameter and average casing length are in the range from 0.05 up to 0.30.

12. A radiation image storage phosphor screen or panel emitting radiation after stimulation of phosphor particles having stored energy from X-rays having impinged upon said screen or panel, said panel comprising a substrate having a planar surface; a multiplicity of cylindrical needle-shaped phosphors extending onto the surface of the substrate, said phosphors being the needle-shaped $CsBr:Eu^{2+}$ storage phosphor particles in form of a cylinder, according to claim 11.

13. Radiation image storage phosphor screen according to claim 12, wherein a light reflective coating is disposed along the walls of said cylinders, arranged in order to reflect, at least partially, radiation emitted by said phosphors after having performed stimulation thereupon.

14. Use of a radiation image storage phosphor panel according to claim 12 in an image forming method for storing and reproducing a radiation image comprising the steps of exposing said radiation image storage panel with radiation energy having passed through an object or having been emitted by said object and storing said radiation energy in form of a latent image on said image storage panel; releasing the stored energy in form of light upon irradiation with stimulating rays of the visible or infrared region, thereby emitting light from the ultraviolet or visible wavelength region; collecting said light released from the storage panel by lightcollecting means and converting the collected light into a series of electric signals;.producing an image corresponding to the latent image from the electric signals.

15. Needle-shaped $CsBr:Eu^{2+}$ storage phosphor particles according to claim 2, wherein variation coefficients upon average cross-section diameter and average casing length are in the range from 0.05 up to 0.20.

16. A radiation image storage phosphor screen or panel emitting radiation after stimulation of phosphor particles having stored energy from X-rays having impinged upon said screen or panel, said panel comprising a substrate having a planar surface; a multiplicity of cylindrical needle-shaped phosphors extending onto the surface of the substrate, said phosphors being the needle-shaped $CsBr:Eu^{2+}$ storage phosphor particles in form of a cylinder, according to claim 15.

17. Radiation image storage phosphor screen according to claim 16, wherein a light reflective coating is disposed along the walls of said cylinders, arranged in order to reflect, at least partially, radiation emitted by said phosphors after having performed stimulation thereupon.

18. Use of a radiation image storage phosphor panel according to claim 16 in an image forming method for storing and reproducing a radiation image comprising the steps of exposing said radiation image storage panel with radiation energy having passed through an object or having been emitted by said object and storing said radiation energy in form of a latent image on said image storage panel; releasing the stored energy in form of light upon irradiation with stimulating rays of the visible or infrared region, thereby emitting light from the ultraviolet or visible wavelength region; collecting said light released from the storage panel by lightcollecting means and converting the collected light into a series of electric signals; producing an image corresponding to the latent image from the electric signals.

19. A radiation image storage phosphor screen or panel emitting radiation after stimulation of phosphor particles having stored energy from X-rays having impinged upon said screen or panel, said panel comprising a substrate having a planar surface; a multiplicity of cylindrical needle-shaped phosphors extending onto the surface of the substrate, said phosphors being the needle-shaped $CsBr:Eu^{2+}$ storage phosphor particles in form of a cylinder, according to claim 2.

20. Radiation image storage phosphor screen according to claim 19, wherein a light reflective coating is disposed along the walls of said cylinders, arranged in order to reflect, at least partially, radiation emitted by said phosphors after having performed stimulation thereupon.

21. Use of a radiation image storage phosphor panel according to claim 19 in an image forming method for storing and reproducing a radiation image comprising the steps of exposing said radiation image storage panel with radiation energy having passed through an object or having been emitted by said object and storing said radiation energy in form of a latent image on said image storage panel; releasing the stored energy in form of light upon irradiation with stimulating rays of the visible or infrared region, thereby emitting light from the ultraviolet or visible wavelength region; collecting said light released from the storage panel by light-collecting means and converting the collected light into a series of electric signals; producing an image corresponding to the latent image from the electric signals.

22. Needle-shaped $CsBr:Eu^{2+}$ storage phosphor particles according to claim 1, wherein said phosphor particles have an average aspect ratio of length to cross-section diameter in the range from 5 to 200.

23. Needle-shaped $CsBr:Eu^{2+}$ storage phosphor particles according to claim 22, wherein variation coefficients upon average cross-section diameter and average casing length are in the range from 0.05 up to 0.30.

24. Needle-shaped $CsBr:Eu^{2+}$ storage phosphor particles according to claim 22, wherein variation coefficients upon average cross-section diameter and average casing length are in the range from 0.05 up to 0.20.

25. A radiation image storage phosphor screen or panel emitting radiation after stimulation of phosphor particles having stored energy from X-rays having impinged upon said screen or panel, said panel comprising a substrate having a planar surface; a multiplicity of cylindrical needle-shaped phosphors extending onto the surface of the substrate, said phosphors being the needle-shaped $CsBr:Eu^{2+}$ storage phosphor particles in form of a cylinder, according to claim 22.

26. Radiation image storage phosphor screen according to claim 25, wherein a light reflective coating is disposed along the walls of said cylinders, arranged in order to reflect, at least partially, radiation emitted by said phosphors after having performed stimulation thereupon.

27. Use of a radiation image storage phosphor panel according to claim 25 in an image forming method for storing and reproducing a radiation image comprising the steps of exposing said radiation image storage panel with radiation energy having passed through an object or having been emitted by said object and storing said radiation energy in form of a latent image on said image storage panel; releasing the stored energy in form of light upon irradiation with stimulating rays of the visible or infrared region, thereby emitting light from the ultraviolet or visible wavelength region; collecting said light released from the storage panel by light-collecting means and converting the collected light into a series of electric signals; producing an image corresponding to the latent image from the electric signals.

28. Needle-shaped CsBr:Eu$^{2+}$ storage phosphor particles according to claim 1, wherein said phosphor particles have an average aspect ratio of length to cross-section diameter in the range from 20 to 100.

29. Needle-shaped CsBr:Eu$^{2+}$ storage phosphor particles according to claim 28, wherein variation coefficients upon average cross-section diameter and average casing length are in the range from 0.05 up to 0.30.

30. Needle-shaped CsBr:Eu$^{2+}$ storage phosphor particles according to claim 28, wherein variation coefficients upon average cross-section diameter and average casing length are in the range from 0.05 up to 0.20.

31. A radiation image storage phosphor screen or panel emitting radiation after stimulation of phosphor particles having stored energy from X-rays having impinged upon said screen or panel, said panel comprising a substrate having a planar surface; a multiplicity of cylindrical needle-shaped phosphors extending onto the surface of the substrate, said phosphors being the needle-shaped CsBr:Eu$^{2+}$ storage phosphor particles in form of a cylinder, according to claim 28.

32. Radiation image storage phosphor screen according to claim 31, wherein a light reflective coating is disposed along the walls of said cylinders, arranged in order to reflect, at least partially, radiation emitted by said phosphors after having performed stimulation thereupon.

33. Use of a radiation image storage phosphor panel according to claim 31 in an image forming method for storing and reproducing a radiation image comprising the steps of exposing said radiation image storage panel with radiation energy having passed through an object or having been emitted by said object and storing said radiation energy in form of a latent image on said image storage panel; releasing the stored energy in form of light upon irradiation with stimulating rays of the visible or infrared region, thereby emitting light from the ultraviolet or visible wavelength region; collecting said light released from the storage panel by light-collecting means and converting the collected light into a series of electric signals; producing an image corresponding to the latent image from the electric signals.

34. Needle-shaped CsBr:Eu$^{2+}$ storage phosphor particles according to claim 1, wherein variation coefficients upon average cross-section diameter and average casing length are in the range from 0.05 up to 0.30.

35. A radiation image storage phosphor screen or panel emitting radiation after stimulation of phosphor particles having stored energy from X-rays having impinged upon said screen or panel, said panel comprising a substrate having a planar surface; a multiplicity of cylindrical needle-shaped phosphors extending onto the surface of the substrate, said phosphors being the needle-shaped CsBr:Eu$^{2+}$ storage phosphor particles in form of a cylinder, according to claim 34.

36. Radiation image storage phosphor screen according to claim 35, wherein a light reflective coating is disposed along the walls of said cylinders, arranged in order to reflect, at least partially, radiation emitted by said phosphors after having performed stimulation thereupon.

37. Use of a radiation image storage phosphor panel according to claim 35 in an image forming method for storing and reproducing a radiation image comprising the steps of exposing said radiation image storage panel with radiation energy having passed through an object or having been emitted by said object and storing said radiation energy in form of a latent image on said image storage panel; releasing the stored energy in form of light upon irradiation with stimulating rays of the visible or infrared region, thereby emitting light from the ultraviolet or visible wavelength region; collecting said light released from the storage panel by light-collecting means and converting the collected light into a series of electric signals; producing an image corresponding to the latent image from the electric signals.

38. Needle-shaped CsBr:Eu$^{2+}$ storage phosphor particles according to claim 1, wherein variation coefficients upon average cross-section diameter and average casing length are in the range from 0.05 up to 0.20.

39. A radiation image storage phosphor screen or panel emitting radiation after stimulation of phosphor particles having stored energy from X-rays having impinged upon said screen or panel, said panel comprising a substrate having a planar surface; a multiplicity of cylindrical needle-shaped phosphors extending onto the surface of the substrate, said phosphors being the needle-shaped CsBr:Eu$^{2+}$ storage phosphor particles in form of a cylinder, according to claim 38.

40. Radiation image storage phosphor screen according to claim 39, wherein a light reflective coating is disposed along the walls of said cylinders, arranged in order to reflect, at least partially, radiation emitted by said phosphors after having performed stimulation thereupon.

41. Use of a radiation image storage phosphor panel according to claim 39 in an image forming method for storing and reproducing a radiation image comprising the steps of exposing said radiation image storage panel with radiation energy having passed through an object or having been emitted by said object and storing said radiation energy in form of a latent image on said image storage panel; releasing the stored energy in form of light upon irradiation with stimulating rays of the visible or infrared region, thereby emitting light from the ultraviolet or visible wavelength region; collecting said light released from the storage panel by light-collecting means and converting the collected light into a series of electric signals; producing an image corresponding to the latent image from the electric signals.

42. A radiation image storage phosphor screen or panel emitting radiation after stimulation of phosphor particles having stored energy from X-rays having impinged upon said screen or panel, said panel comprising a substrate having a planar surface; a multiplicity of cylindrical needle-shaped phosphors extending onto the surface of the substrate, said phosphors being the needle-shaped CsBr:Eu$^{2+}$ storage phosphor particles in form of a cylinder, according to claim 1.

43. Radiation image storage phosphor screen according to claim 42, wherein a light reflective coating is disposed along the walls of said cylinders, arranged in order to reflect, at least partially, radiation emitted by said phosphors after having performed stimulation thereupon.

44. Use of a radiation image. storage phosphor panel according to claim 42 in an image forming method for storing and reproducing a radiation image comprising the steps of exposing said radiation image storage panel with radiation energy having passed through an object or having been emitted by said object and storing said radiation energy in form of a latent image on said image storage panel; releasing the stored energy in form of light upon irradiation with stimulating rays of the visible or infrared region, thereby emitting light from the ultraviolet or visible wavelength region; collecting said light released from the storage panel by light-collecting means and converting the collected light into a series of electric signals; producing an image corresponding to the latent image from the electric signals.

* * * * *